(12) United States Patent
Gronemeier et al.

(10) Patent No.: US 6,461,029 B2
(45) Date of Patent: Oct. 8, 2002

(54) LED POSITION LAMP

(75) Inventors: Frank Gronemeier, Boenen; Sascha Lueder, Rietberg; Rico Schulz, Lippstadt, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/737,971

(22) Filed: Dec. 18, 2000

(65) Prior Publication Data

US 2002/0008976 A1 Jan. 24, 2002

(30) Foreign Application Priority Data

Jul. 18, 2000 (DE) .......................................... 100 34 767

(51) Int. Cl.$^7$ ............................................... F21V 21/00
(52) U.S. Cl. ...................... 362/545; 362/184; 362/231; 362/470; 362/800; 340/982
(58) Field of Search ................. 362/470, 545, 362/547, 231, 247, 243, 184, 800; 340/982

(56) References Cited

U.S. PATENT DOCUMENTS

| | | | | |
|---|---|---|---|---|
| 3,255,343 A | * | 6/1966 | Kloss ........................ | 362/470 |
| 4,912,334 A | * | 3/1990 | Anderson ................... | 362/470 |
| 5,567,036 A | * | 10/1996 | Theobald et al. ........... | 362/800 |
| 5,665,305 A | * | 9/1997 | Belliveau et al. ........... | 362/294 |
| 6,019,493 A | * | 2/2000 | Kuo et al. ................... | 362/800 |
| 6,268,702 B1 | * | 7/2000 | Fleck .......................... | 362/231 |
| 6,244,728 B1 | * | 12/2001 | Cote et al. ................... | 362/249 |

\* cited by examiner

Primary Examiner—Sandra O'Shea
Assistant Examiner—Guiyoung Lee
(74) Attorney, Agent, or Firm—Birch, Stewart, Kolasch & Birch, LLP

(57) ABSTRACT

A lamp, in particular a position lamp for a motor vehicle, has a housing in which at least one light source is arranged, with the housing having a light pane covering an opening of the housing, with the light source being structured as a plurality of light-emitting diodes. A light field formed by a plurality of similar first light-emitting diodes to produce a basic light-intensity distribution and at least one additional second light-emitting diode to produce a preferred light-intensity distribution is provided so that a predetermined total light-intensity distribution is obtained by superpositioning, or overlapping, of the basic light-intensity distribution and the preferred light-intensity distribution.

21 Claims, 4 Drawing Sheets

LED POSITION LAMP

BACKGROUND OF THE INVENTION

This application claims a priority of German application 100 34 767.3, filed Jul. 18, 2000, and the contents of that application are incorporated herein by reference.

This invention relates to a lamp, in particular a position lamp for a motor vehicle, having a housing in which at least one light source is arranged and having a light pane covering an opening of the housing.

It is conventional to equip lamps with incandescent bulbs and a reflector to achieve, for example, a desired light-intensity distribution for a position lamp. In the case of motor vehicles, reflectors which produce a uniform emittance of light with a symmetrical light-intensity distribution are used. In the case of aircraft, it is known that when a position lamp is provided on a free end of a wing, for example, different light-intensity distributions in the vertical and horizontal directions are required. One disadvantage of such a known lamp is that the light intensity of the incandescent bulb must be relatively high, because in order to ensure the functionality of the night vision equipment used by pilots, light rays of a certain wavelength must be filtered out by an additional light-absorbing light filter mounted on the lamp. Due to the absorbing effect of the filters, there is self-heating of the incandescent bulb, which shortens the lifetime of the lamp.

It is therefore an object of this invention to improve upon a lamp for motor vehicles such that it is possible to assure that a predetermined light-intensity distribution will be achieved with economical operation and a relatively long lifetime.

SUMMARY OF THE INVENTION

According to principles of this invention, in a lamp, in particular a position lamp for a motor vehicle having a housing in which at least one light source is arranged and having a light pane that covers an opening of the housing, a light source is structured as a plurality of light-emitting diodes (LEDs) with an illumination field formed by a plurality of similar first light-emitting diodes provided to create a basic light-intensity distribution, and at least one additional second light-emitting diode provided to produce a preferred light-intensity distribution, so that by superimposing the basic light-intensity distribution on the preferred light-intensity distribution a predetermined total light-intensity distribution is produced.

A particular advantage of this invention is that due to the presence of light-emitting diodes of different luminous properties, it is possible to achieve a basic light-intensity distribution as well as a preferred light-intensity distribution, which can be superimposed to produce a predetermined total light-intensity distribution. A basic idea of this invention is to form an illumination field with a plurality of similarly structured light-emitting diodes with which the basic light-intensity distribution is achieved. A preferred light-intensity distribution can be produced in a certain spatial angle range by additional second light-emitting diodes, usually having a greater power, oriented in a certain preferred direction. By selecting the second light-emitting diodes of the certain light intensity or light-intensity distribution, it is possible to configure a specific total light-intensity distribution in an advantageous manner. A power consumption of the lamp can be reduced and its lifetime greatly increased by using light-emitting diodes. In particular, through the choice of light-emitting diodes, it is possible to achieve a spectrum which stays away from interfering with a wavelength range of night vision equipment. The filter glass is omitted and it is not necessary to use an additional night vision filter.

According to a particular embodiment of this invention, the first light-emitting diodes are combined in a separate basic light module which is a compact unit having a module housing with only two connecting pins. A plurality of first light-emitting diodes is connected together on a light-emitting diode carrier. The first light-emitting diodes may be mounted with a relatively high packing density. By combining the first light-emitting diodes on the light-emitting diode carrier, a separate mechanical and electrical coupling of the basic light module from the housing of the lamp can be created in an advantageous manner. The mounting of the basic light module is simplified because only two electric terminals are provided. By combining the first light-emitting diodes in the module housing, the first light-emitting diodes can be protected mechanically and also can be arranged within the housing of the lamp by the secure mechanical and electronic connection.

According to another embodiment of this invention, the first light-emitting diodes are arranged in a grid on a light-emitting diode carrier plate of the module housing so that a uniformly and broadly-radiated light-intensity distribution can be achieved. The first light-emitting diodes preferably each have a relatively low light intensity. By superimposing a plurality of such regularly arranged first light-emitting diodes, a basic light-intensity distribution having a relatively constant gradient over a spatial angle range can be achieved in an uncomplicated manner.

According to another embodiment of this invention, the basic light module is mounted on a first holding part, and the additional second light-emitting diodes are arranged on a second holding part of the housing, with the holding parts being arranged at an inclination to each other by a predetermined angle. In this way a maximum value of the basic light-intensity distribution on the one hand and the preferred light-intensity distribution on the other hand can be defined in space in an advantageous manner, so that a predetermined total light-intensity distribution is achieved.

According to another embodiment of this invention, the housing of the lamp is arranged on a free end of a wing of an aircraft, where the lamp serves as a position lamp. The second holding part extends perpendicular to the direction of flight, and the second light-emitting diodes mounted on the second holding part are oriented in the direction of flight. The first part extends at an acute angle rearwardly to the second holding part, so that the basic light is emitted substantially in a lateral direction to the longitudinal axis of the vehicle.

According to another embodiment of this invention, a reflector element is arranged at a borderline area between the first and second holding parts, so that beams of light emitted by the second light-emitting diodes are partially reflected by this reflector element. The reflector element thus serves to increase the light intensity emitted by the second light-emitting diodes in certain spatial angles. In addition, the reflector element also has an light-shield function. An edge of the reflector element facing way from the borderline area is oriented with respect to the basic light module so that an exact light-dark border image is achieved at a predetermined angle. By this means a blinding of pilots can be prevented.

According to another embodiment of this invention, the basic light module has a light-transmissive cover in the form of a cupola, or dome, which permits a homogeneous emission characteristic.

According to another embodiment of this invention, an infrared diode is positioned on a base plate oriented in the direction of flight. In this way it is possible to send optical identification patterns between members of a flight group for identification of friend vs. foe. Since the infrared diode projects laterally outward away from the base plate, there is a main direction of emittance perpendicular to the direction of flight, thus preventing a direct blinding of pilots.

According to another embodiment of this invention, the basic light module and the second light-emitting diodes are driven by a common control circuit. The basic light module on the one hand and the second light-emitting diodes on the other hand are connected in parallel, so that a total current, which is delivered as an impressed supply-current amperage from the control circuit to the consumer elements, is determined as a function of the prevailing component currents flowing in branches. The control circuit preferably has a step-down converter and at least one constant current source with which the consumer-dependent supply-current amperage is applied.

BRIEF DESCRIPTION OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout. The drawings are not necessarily to scale, emphasis instead being placed upon illustrating principles of the invention in a clear manner.

DETAILED DESCRIPTION OF THE INVENTION

Figure 1:
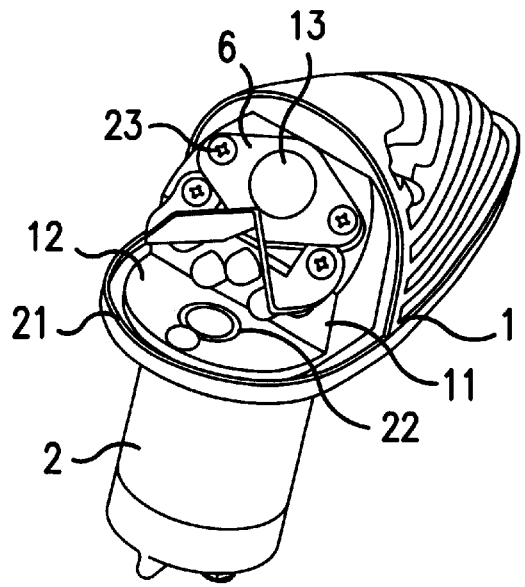
FIG. 1 is a perspective front view of a lamp of this invention.
Figure 2:
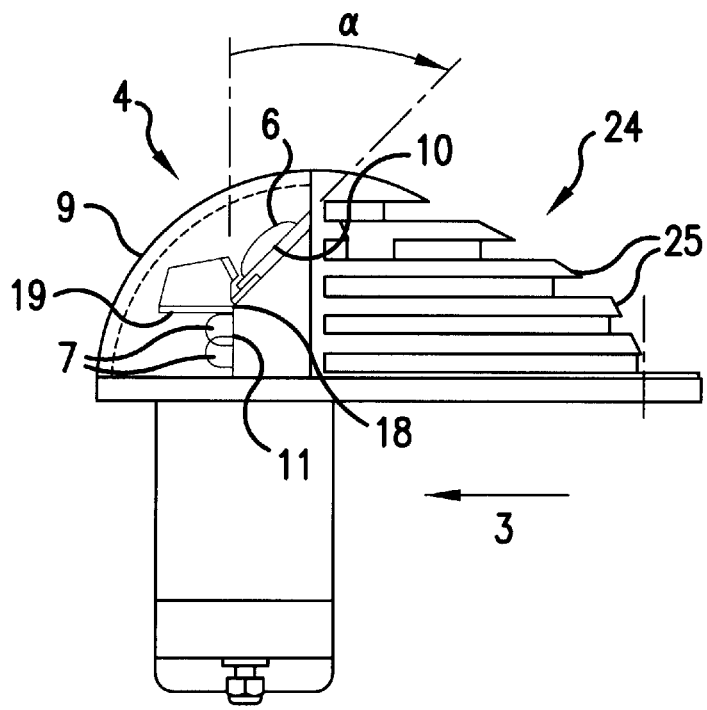
FIG. 2 is a side view of the lamp of FIG. 1.
Figure 3:
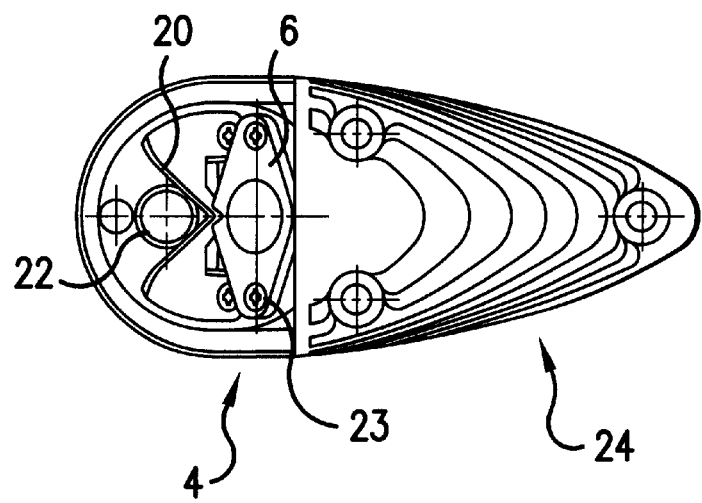
FIG. 3 is a top, or end view of the lamp of FIG. 1.
Figure 4:
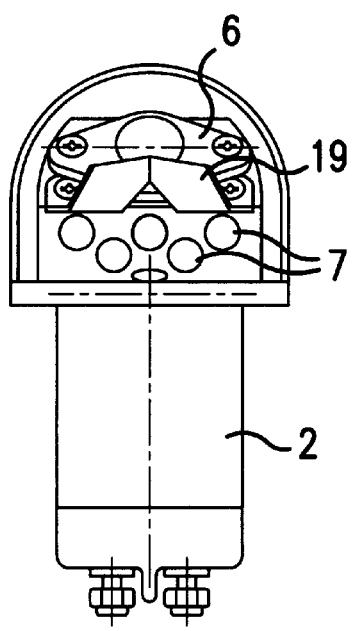
FIG. 4 is a front view of the lamp of FIG. 1.

A lamp of this invention is used as a position lamp for an aircraft, in particular planes or helicopters. To this end, the position lamp is arranged on a free end of a wing of an aircraft projecting perpendicular to a direction of flight. The lamp has a housing 1 on whose base side a cylindrical socket 2 is connected for engaging in an opening in an outer shell of the aircraft and being affixed there. The housing 1 is structured generally in the shape of an egg, tapering to a point in a direction opposite to flight 3, so as to be aerodynamically advantageous.

In a front of the housing 1, in the direction of flight 3, there is a lamp compartment 4 in which a basic light module 6 of a plurality of first light-emitting diodes 5, a plurality of second light-emitting diodes 7 and a reflector element 19 are arranged. The lamp compartment 4 is covered by a clear light pane 9.

The basic light module 6 is arranged on a first plate-shaped (flat) holding part 10 and the second light-emitting diodes 7 are arranged on an adjacent, laterally-offset, second holding part 11 extending at an acute angle $\alpha$ to the first holding part 10. A base plate 12, which is usually arranged perpendicular to a longitudinal axis of an aircraft wing, is connected at a right angle to the second holding part 11, along the direction of flight 3.

Figure 5:
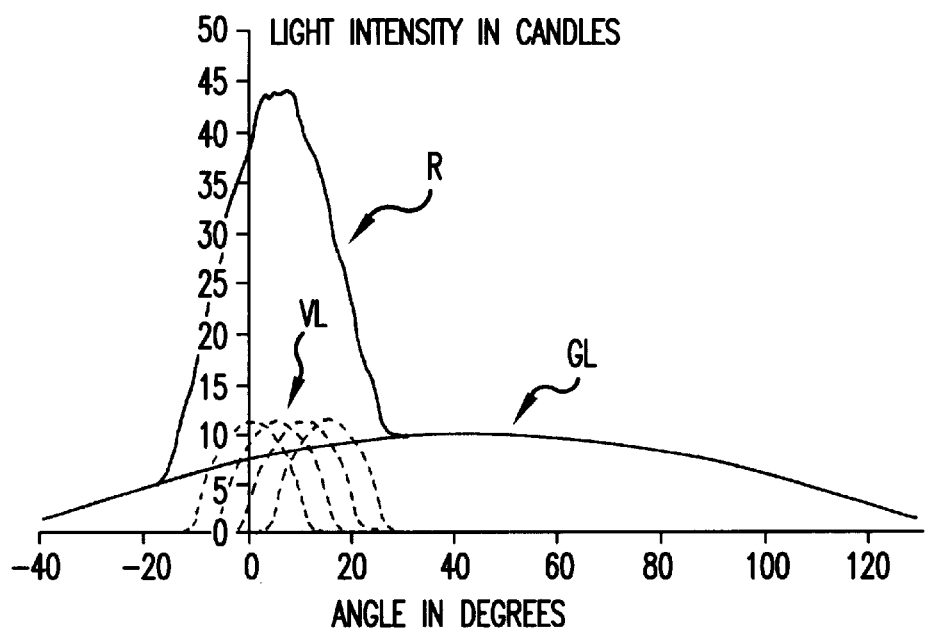
FIG. 5 is a graph showing a plot of a horizontal total light-intensity distribution of a lamp of this invention.

The basic light module 6 forms a circular field of illumination 13 which creates a spherical basic light-intensity distribution GL according to FIG. 5. The basic light-intensity distribution GL is illustrated in FIG. 5 in the horizontal direction. A maximum of the horizontal basic light-intensity distribution GL is at an angle of approx. 50 degrees; which angle corresponds to the angle of inclination $\alpha$ at which the first holding part 10 and the second holding part 11 are structured to be inclined to one another.

Figure 7:
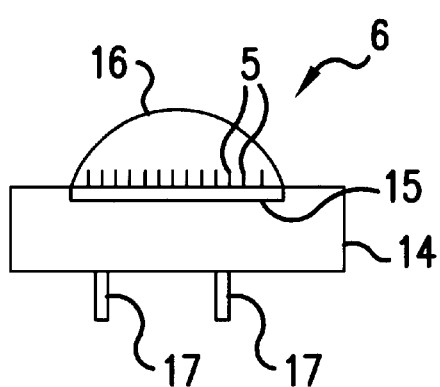
FIG. 7 is an enlarged side view of a basic light module used in a lamp of this invention.

As illustrated better in FIG. 7, the basic light module 6 includes a module housing 14 in which is arranged an LED carrier 15 in the form of a substantially-flat board. A plurality of first light-emitting diodes 5 are arranged in a grid pattern on the LED carrier 15. The individual first light-emitting diodes 5 have a relatively low light intensity. A light intensity corresponding to the light intensity of a single second light-emitting diode 7 can be achieved by super-positioning, or overlapping, the plurality of first light-emitting diodes 5 (see FIG. 5). The LED carrier 15 is closed by a light-transmissive dome-shaped cover 16 which allows light emitted by the first light-emitting diodes 5 to be radiated in a three-dimensional angle range of approximately 170 degrees. The first light-emitting diodes 5 are attached in rows and columns in a grid on the LED carrier 15, so that the light-emitting diodes are always switched in rows, and in parallel with one another. The connections of the first light-emitting diodes run together on the LED carrier 15 and are electrically coupled through to two terminal pins 17 which project outward on the back side of the module housing 14. This creates a separate and compact module, which produces a relatively constant light-intensity distribution over a large spatial angle range. As shown in FIG. 5, for example, this light distribution can be used to create a basic light-intensity distribution GL of the lamp. By positioning five of the second light-emitting diodes 7, for example, on the second holding part 11, this yields an offset arrangement of light-intensity distributions due to the offset positioning of the second light-emitting diodes 7 to one another. By superimposing these light-intensity distributions, a preferred light-intensity distribution VL is obtained, resulting in a relatively high maximum total light-intensity distribution R, which is composed of the basic light-intensity distribution GL and the preferred light-intensity distribution VL. Because of the arrangement of five second light-emitting diodes 7, a maximum total light-intensity distribution R is approximately five times greater than the maximum basic light-intensity distribution GL. In this way, a predetermined total light-intensity distribution R in horizontal and vertical directions can be produced in a controlled manner.

Figure 6:
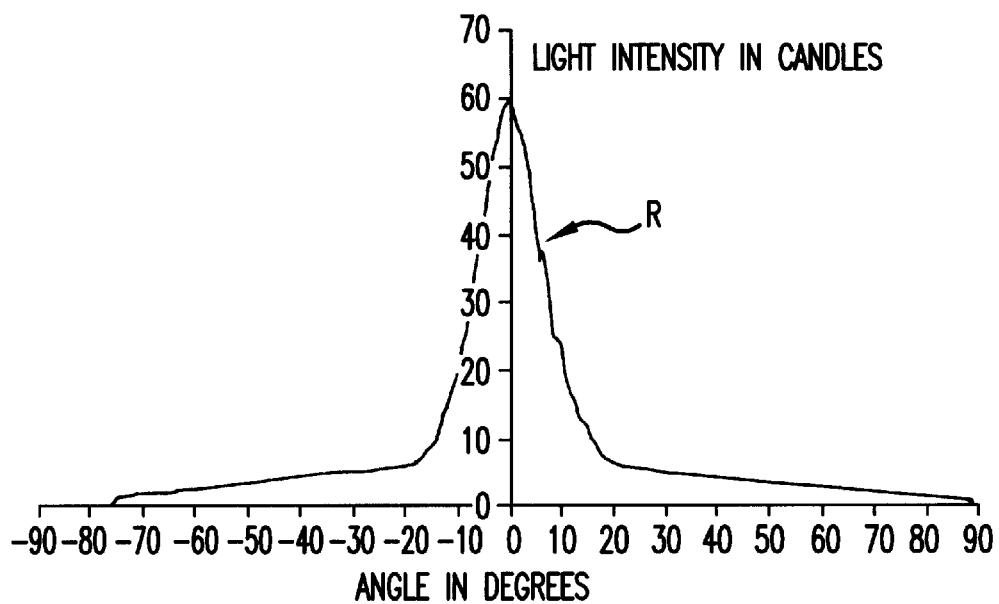
FIG. 6 is a graph showing a plot of a vertical total light-intensity distribution of a lamp of this invention.
Figure 8:
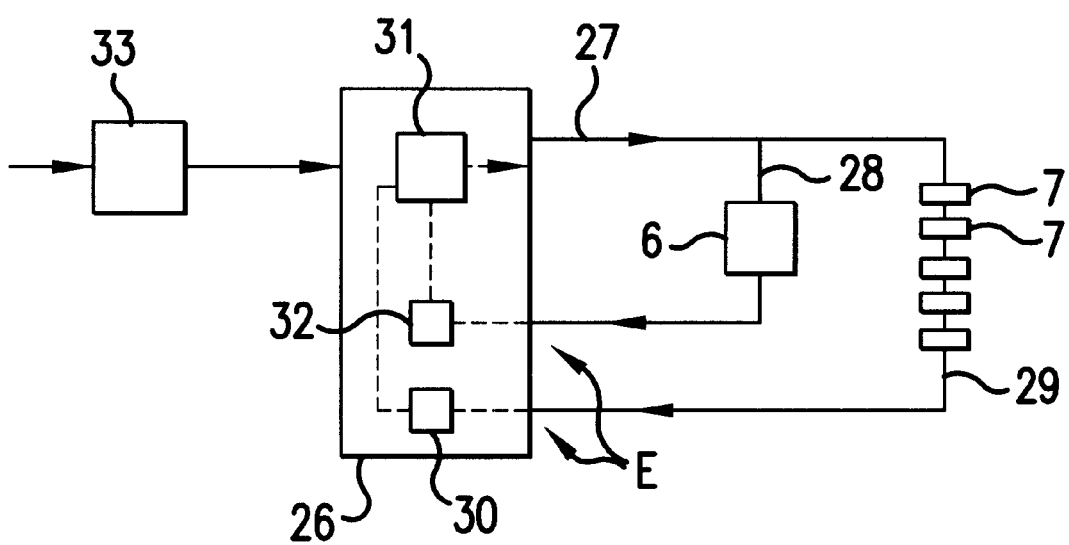
FIG. 8 is a block circuit diagram of a controller for a lamp of this invention.

Because the basic light module 6 is inclined at an acute angle $\alpha$ to the direction of flight 3, while the second light-emitting diodes 7 are oriented in the direction of flight 3, the preferred light-intensity distribution VL of the second light-emitting diodes 7 contributes mainly to the total vertical light-intensity distribution R (see FIG. 6). The vertical total light-intensity distribution R is arranged symmetrically to a zero point.

To increase the light intensity of the basic light module 6, the reflector element 19 is arranged at a borderline area 18 between the first and second holding parts 10 and 11, which reflects a portion of the beams of light emitted by the basic light module 6. In addition, the reflector element 19 is arranged relative to the basic light module 6 so that an edge 20 which is located on a side of the reflector element 19 facing away from the borderline area 18 precisely creates a light-dark boundary image for the basic light-intensity distribution GL. In this way, the light-dark boundary of the basic light-intensity distribution can be set at 0 degrees, for example (not shown in FIG. 5). So that pilots are not blinded by the light of the basic light module 6, the modules are arranged to be offset relative to a front edge 21 of the base plate 12, opposite to the direction of flight 3. In this way the base plate 12 can serve as a shield for light emitted by the second light-emitting diodes 7.

In addition, an infrared diode 22 may be mounted flush in the base plate 12 so that a flashing optical pattern can be generated for identification of friend or foe for members of a flight group.

The reflector element 19 and module housing 14 are mounted on the first holding part 10 by screw connections 23. Opposite the direction of flight 3, a cooling body 24 having a plurality of disc-shaped cooling ribs 25 is connected to the lamp compartment 4, which serves to cool the lamp compartment 4 and the electronic components. The electronic components are coupled to the cooling ribs 25 by suitable heat conducting materials.

A control circuit 26 is provided for controlling the basic light module 6 on the one hand and the second light-emitting diodes 7 on the other hand, which control circuit 26 has a step-down converter 31 which converts an onboard d.c. voltage of 28 V into a lower d.c. voltage. A constant current source connected downstream from this step-down converter 31 applies a supply-current amperage 27 as a function of a current demand of consumer elements (basic light module 6, second light-emitting diodes 7). Because the basic light module 6 in a first branch 28 and the series-connected second light-emitting diodes 7 in a second branch 29 are connected in parallel, a constant voltage is applied in branches 28, 29. In the event of a failure of individual second light-emitting diodes 7 or a failure of the consumer elements of an entire branch, a constant supply current can be adapted which respects limit values. To this end, the current is returned through branches 28 and 29 through separate inputs E of the control circuit 26. Another constant current source 30 is connected at the input of the second branch 29 which can have an appropriate influence on the converter 31 that delivers the supply amperage 27. The current returned through the first branch 28 is processed further in a reference circuit 32, which exercises a controlling function on the constant current source 30 and converter 31.

A safety circuit 33 is preferably connected upstream from the control circuit 26 to shut down the power supply current 27 in the event of an over voltage of more than 48 V according to a hysteresis characteristic, and if the voltage drops below a predetermined voltage threshold this safety circuit makes it possible to again supply the required current amperage 28. In addition, the safety circuit 33 may have a polarity reversal protection which guarantees that the power supply voltage will be switched through only when the contacting of the light-emitting diodes and/or the basic light module is correct.

According to an alternative embodiment, the lamp compartment 4 may also be structured to not have a reflector element. It is self-evident that the number of second light-emitting diodes 7 may be varied, depending on given requirements, or they may be arranged in rows or in a field in the manner of a grid.

We claim:

1. A lamp for a motor vehicle, having a housing in which at least first and second light sources are arranged and having a light pane that covers an opening of the housing,
    wherein said first light source comprises a plurality of substantially identical first light-emitting diodes, with an illumination field formed by the plurality of substantially identical first light-emitting diodes producing a basic light-intensity distribution within said illumination field, said basic light-intensity distribution having a basic pattern varying substantially evenly throughout the illumination field,
    wherein said second light source has a structure significantly different from that of said first light source, including at least one second light-emitting diode that has a substantially higher optical output power than each of said first light-emitting diodes producing an additional light-intensity distribution in a predetermined spatial angle of said illumination field, that is substantially less than 100% of said illumination field,
    wherein said basic light-intensity distribution and said additional light-intensity distribution are added to each other so that within the illumination field a predetermined total light-intensity distribution is obtained having a total pattern varying substantially evenly throughout the illumination field except at said spatial angle where said total pattern significantly protrudes outwardly from said basic pattern.

2. The lamp according to claim 1, wherein the first light-emitting diodes of said first light source are assembled in one basic light module having a closed module housing with a light-transmissive cover as a separate unit from said second light source, with the first light-emitting diodes being mounted on a mounting surface of a first light-emitting diode carrier extending in the closed module housing, wherein said first light-emitting diodes are combined so that only two terminal pins project out of the module housing.

3. The lamp according to claim 2, wherein the first light-emitting diodes are uniformly distributed on the mounting surface of said first light-emitting diode carrier, and each of the first light-emitting diodes has a much lower light intensity relative to the at least one second light-emitting diode.

4. The lamp according to claim 2, wherein the first light-emitting diode carrier is structured in the form of a substantially flat board on which the first light-emitting diodes are arranged in the manner of a grid, wherein said at least one second light-emitting diode of said second light source is mounted on a mounting surface of a second light-emitting diode carrier, said mounting surfaces of said first and second light-emitting diode carriers being separated by an angle greater than 180°, with said first and second light-emitting diodes being positioned within said angle.

5. The lamp according to claim 1, wherein the additional light-intensity distribution is formed by superimposing at least three second light-emitting diodes arranged adjacent one another, with the total light intensity of the second light source corresponding to the total, light intensity of the first light source.

6. An aircraft including the lamp of claim 1, wherein the housing is arranged on one free end of a wing of the aircraft, wherein the first light source is a basic light module that is arranged on a first holding part of the housing, and the at least one additional second light-emitting diode is arranged on a second holding part of the housing, with the second holding part being essentially perpendicular to a direction of flight of the aircraft and the first holding part being arranged at an acute angle to the second holding part about a vertical axis.

7. The lamp according to claim 1, wherein a reflector element is arranged in a borderline area between the first and the second light sources for reflecting light rays emitted by at least one of the basic light module and the second light-emitting diode to diverge from a horizontal plane.

8. The lamp according to claim 2, wherein the basic light module has a light-transmissive dome-shaped cover.

9. The aircraft according to claim 6, wherein an infrared diode is positioned:on a base plate oriented perpendicular to the second holding part and in the direction of flight.

10. The lamp according to claim 8, wherein a cooling body having a plurality of cooling ribs arranged in a disc pattern is adjacent to and connected to one side of a lamp compartment bordered by a base plate, the first holding part, the second holding part and the light pane.

11. The lamp according to claim 1, wherein said second light source includes a plurality of second light-emitting diodes that are connected in series in a second branch, and the basic light module is connected in a first branch in parallel with the second branch; a control circuit is provided to apply a current amperage in the first and second branches, and the current flowing through the branches is returned separately to the control circuit so that a current amperage can be regulated as a function of instantaneous amperages of the branches.

12. The lamp according to claim 11, wherein the control circuit has a step-down controller and at least one constant current source.

13. A lamp for a motor vehicle, having a housing in which at least first and second light sources are arranged and having a light pane that covers an opening of the housing, wherein the first light source is structured as a plurality of light-emitting diodes, with an illumination field formed by a plurality of similar first light-emitting diodes thereof producing a basic light-intensity distribution and at least one additional second light-emitting diode producing a preferred light-intensity distribution so that by superimposing the basic light-intensity distribution and the preferred light-intensity distribution a predetermined total light-intensity distribution is obtained;

wherein the first light-emitting diodes are assembled in one basic light module having a closed module housing with a light-transmissive cover as a separate unit, with the first light-emitting diodes being mounted on a common light-emitting diode carrier extending in the closed module housing, wherein said first light-emitting diodes are combined so that only two terminal pins project out of the module housing; and wherein the first light-emitting diodes are uniformly distributed on the light-emitting diode carrier, and the first light-emitting diodes have a much lower light intensity relative to the second light-emitting diodes.

14. A lamp for a motor vehicle, having a housing in which at least first and second light sources are arranged and having a light pane that covers an opening of the housing, wherein the first light source is structured as a plurality of light-emitting diodes, with an illumination field formed by a plurality of similar first light-emitting diodes thereof producing a basic light-intensity distribution and at least one additional second light-emitting diode producing a preferred light-intensity distribution so that by superimposing the basic light-intensity distribution and the preferred light-intensity distribution a predetermined total light-intensity distribution is obtained;

wherein the first light-emitting diodes are uniformly distributed on the light-emitting diode carrier, and the first light-emitting diodes have a much lower light intensity relative to the second light-emitting diodes.

15. A lamp for a motor vehicle, having a housing in which at least first and second light sources are arranged and having a light pane that covers an opening of the housing, wherein the first light source is structured as a plurality of light-emitting diodes, with an illumination field formed by a plurality of similar first light-emitting diodes thereof producing a basic light-intensity distribution;

wherein the second light source includes at least one additional second light-emitting diode producing a preferred light-intensity distribution so that by superimposing the basic light-intensity distribution and the preferred light-intensity distribution a predetermined-total light-intensity distribution is obtained; and wherein there are a plurality of second light-emitting diodes that are connected in series in a second branch, and the basic light module is connected in a first branch which is parallel to the second branch; a control circuit is provided to apply a current amperage in the first and second branches, and the current flowing through the branches is returned separately to the control circuit so that a current amperage can be regulated as a function of instantaneous amperages of the branches.

16. The lamp according to claim 15, wherein the control circuit has a step-down controller and at least one constant current source.

17. The lamp according to claim 1, wherein the first light source is a basic light module with the basic light module being arranged on a first holding part of the housing, and the second light-emitting diodes are arranged on a second holding part of the housing, and the first holding part is inclined at an angle to the second holding part to form an asymmetrical total light-intensity distribution in a plane extending in a direction of the angle.

18. The lamp according to claim 7, wherein the reflector element has a V-shape.

19. The lamp according to claim 18, wherein said reflector element ensures that the additional light-intensity distribution remains substantially in the predetermined spatial angle of said illumination field.

20. The lamp according to claim 7, wherein said reflector element ensures that the additional light-intensity distribution remains substantially in the predetermined spatial angle of said illumination field.

21. The lamp according to claim 7, wherein said reflector element reflects light rays emitted by both of said basic light module and the second light-emitting diode.

* * * * *